(12) United States Patent
Quan et al.

(10) Patent No.: US 11,131,328 B2
(45) Date of Patent: Sep. 28, 2021

(54) LOAD-SENSING MULTI-WAY VALVE WITH VARIABLE DIFFERENTIAL PRESSURE

(71) Applicant: Taiyuan University of Technology, Taiyuan (CN)

(72) Inventors: Long Quan, Taiyuan (CN); Bo Wang, Taiyuan (CN); Yunxiao Hao, Taiyuan (CN); He Wang, Taiyuan (CN); Zepeng Li, Taiyuan (CN); Lianpeng Xia, Taiyuan (CN)

(73) Assignee: TAIYUAN UNIVERSITY OF TECHNOLOGY, Taiyuan (CN)

( * ) Notice: Subject to any disclaimer, the term of this patent is extended or adjusted under 35 U.S.C. 154(b) by 93 days.

(21) Appl. No.: 16/725,852

(22) Filed: Dec. 23, 2019

(65) Prior Publication Data

US 2020/0209898 A1 Jul. 2, 2020

(30) Foreign Application Priority Data

Dec. 26, 2018 (CN) .......................... 201811601431.8

(51) Int. Cl.
*F15B 13/04* (2006.01)
*G05D 16/00* (2006.01)
*F16K 31/42* (2006.01)

(52) U.S. Cl.
CPC ...... *F15B 13/0416* (2013.01); *F15B 13/0417* (2013.01); *F16K 31/426* (2013.01); *G05D 16/028* (2019.01)

(58) Field of Classification Search
CPC .............. F15B 13/0417; F15B 13/0416; F15B 2211/634; F15B 2211/50518; F15B 2211/5159; F15B 2211/3055; F15B 2211/40569; F15B 2211/40561; F15B 2211/428; F15B 2211/426; F15B 13/0433; F15B 2211/30535; F15B 2013/0409; G05D 16/028; F16K 31/426
See application file for complete search history.

(56) References Cited

U.S. PATENT DOCUMENTS 4,058,140 A * 11/1977 Budzich .............. F15B 11/0445
                                                                 137/596.13
4,327,627 A * 5/1982 Budzich .............. F15B 11/0445
                                                                 137/596

(Continued)

*Primary Examiner* — Umashankar Venkatesan
(74) *Attorney, Agent, or Firm* — Knobbe Martens Olson & Bear LLP

(57) ABSTRACT

The present invention discloses a load-sensing multi-way valve with a variable differential pressure, where each valve group uses a new element: an electro-hydraulic pressure compensation valve, so as to implement continuous real-time adjustment and control of compensated differential pressure and real-time position feedback and monitoring of a compensation valve trim, and overcome a flow mismatch problem of a conventional LS system in a flow saturation working condition and problems of a fixed shunting proportion of an LUDV system and poor operation coordination of actuators. The load-sensing multi-way valve with a variable differential pressure disclosed in the present invention has advantages such as strong working condition applicability, high flow distribution accuracy, and strong technicality.

7 Claims, 4 Drawing Sheets

(56) References Cited

U.S. PATENT DOCUMENTS

| | | | | |
|---|---|---|---|---|
| 4,416,189 A | * | 11/1983 | Budzich | F15B 11/0445 |
| | | | | 137/596.1 |
| 4,437,388 A | * | 3/1984 | Budzich | F15B 11/0445 |
| | | | | 137/596.1 |
| 5,651,390 A | * | 7/1997 | Ishihama | E02F 9/2225 |
| | | | | 137/596 |
| 5,778,929 A | * | 7/1998 | Ishizaki | F15B 13/0403 |
| | | | | 137/596 |
| 5,937,645 A | * | 8/1999 | Hamamoto | F15B 11/165 |
| | | | | 60/422 |
| 9,394,928 B2 | * | 7/2016 | Beschorner | F16K 11/0712 |

* cited by examiner

… (1) …

LOAD-SENSING MULTI-WAY VALVE WITH VARIABLE DIFFERENTIAL PRESSURE

CROSS-REFERENCE TO RELATED APPLICATION

This application claims priority to Chinese Patent Application No. 201811601431.8, filed Dec. 26, 2018, the entire contents of which are hereby incorporated by reference in their entirety.

TECHNICAL FIELD

The present invention belongs to the field of hydraulic technologies, relates to a load-sensing multi-way valve, and specifically, to a load-sensing multi-way valve with a variable compensated differential pressure.

BACKGROUND

A multi-way directional valve is a core element of engineering machinery, and its applications in the engineering machinery currently include positive flow control, negative flow control, and load sensitivity control. Positive and negative flow control technologies are commonly used in excavators in China, and a typical example is an open center multi-way control valve. In this case, there are relatively large throttling losses at an open center and a bypass; no differential pressure compensation technology is used; due to impact of changes in loading pressure and oil source pressure, there is a problem of poor controllability when multiple actuators work simultaneously. However, in a load sensitivity control technology, a pressure compensation valve is disposed before a reversing valve of each set of actuators to make differential pressure Δp before and after a valve port of a control valve kept constant. It can be learned from a formula $$Q = CA\sqrt{\frac{2\Delta p}{\rho}}$$

that, a flow Q flowing to an actuator is only related to an opening size A of the reversing valve, and is not affected by a change in loading pressure, so as to improve system controllability when multiple actuators work simultaneously.

In existing load sensitivity control technologies, a pressure compensation valve is controlled by loading pressure and oil source pressure, and a valve trim of the pressure compensation valve is uncontrollable and cannot be measured in a working process. This is not conducive to the intelligent development of load-sensing multi-way valves. In addition, as shown in FIG. 1, a conventional compensation valve has constant compensated differential pressure Δp, and cannot match a working condition of a system in real time. In a working condition of accurate positioning and inching operation, excessively high compensated differential pressure Δp causes a flow gain and a throttling loss at a valve port, and increases control difficulty of the system. In a working condition with a rapidly changing heavy load, excessively low compensated differential pressure Δp causes an excessively slow response of an actuator and reduces working efficiency of the system. Further, in case of flow saturation, a problem of system flow mismatch resulting from a failure of a pressure compensation valve exists in a conventional load sensitivity (LS) control technology. In a load independent flow distribution (LUDV) technology, operating speeds of various actuators decrease according to a same proportion, and there are a fixed shunting proportion, low shunting accuracy, and poor operation coordination of the actuators.

SUMMARY

To resolve the foregoing problems, the present invention is to provide an intelligent load-sensing multi-way valve with a controllable compensated differential pressure, to continuously adjust and control compensated differential pressure in real time to match different working conditions. The present invention resolves a flow mismatch problem of a conventional load sensitivity control technology in a flow saturation working condition, and improves flow distribution accuracy of a load-sensitive system.

To achieve the foregoing objective, the following technical solution is used in the present invention: A load-sensing multi-way valve with a variable differential pressure is provided, and includes at least one valve group, where each valve group includes an oil-feed passage (1), a pilot-operated oil-feed passage (2), a pilot-operated oil-return passage (3), a load-sensing oil passage (4), an oil-return passage (5), a reversing valve (6), a check valve (7), a shuttle valve (8), a first one-way overflow valve (9), and a second one-way overflow valve (10). The load-sensing multi-way valve with a variable differential pressure further includes an electro-hydraulic pressure compensation valve (11) and a first pilot-operated pressure reducing valve (12).

The electro-hydraulic pressure compensation valve includes a displacement sensor (13), a compensation valve body (14), a compensation valve trim (15), a spring (16), an oil inlet (A), an oil outlet (B), a first control cavity ($P_F$), a second control cavity ($P_E$), and a third control cavity ($P_G$). The compensation valve trim is arranged inside the compensation valve body, and includes three spool lands: a first spool land (17), a second spool land (18), and a third spool land (19); one end of the spring acts on a left end surface C of the compensation valve trim, and the other end thereof acts on the compensation valve body and forms the first control cavity $P_F$ with the first spool land of the compensation valve trim; the displacement sensor is arranged on the compensation valve trim through the compensation valve body, and directly detects a position X and a velocity XV of the valve trim; and the second spool land and the third spool land of the compensation valve trim respectively form the third control cavity $P_G$ and the second control cavity $P_E$ with the compensation valve body.

The electro-hydraulic pressure compensation valve is connected to the system in the following two manners:

a connection manner 1: the electro-hydraulic pressure compensation valve is arranged before the reversing valve; the oil inlet A of the electro-hydraulic pressure compensation valve is communicated with the oil-feed passage; the oil outlet B of the electro-hydraulic pressure compensation valve is communicated with an oil inlet of the check valve and the second control cavity $P_E$ of the electro-hydraulic pressure compensation valve; the third control cavity $P_G$ of the electro-hydraulic pressure compensation valve is communicated with a working oil port of the first pilot-operated pressure reducing valve; an oil inlet and an oil outlet of the first pilot-operated pressure reducing valve are respectively communicated with the pilot-operated oil-feed passage and the pilot-operated oil-return passage; and the load-sensing oil passage is communicated with an oil detection port F of the reversing valve and the first control cavity $P_F$ of the electro-hydraulic pressure compensation valve through the shuttle valve; and a connection manner 2: the electro-hydraulic pressure compensation valve is arranged after the reversing valve; an oil outlet of the check valve is communicated with the oil inlet A of the electro-hydraulic pressure compensation valve and the second control cavity $P_E$ of the electro-hydraulic pressure compensation valve; the first control cavity $P_F$ of the electro-hydraulic pressure compensation valve is communicated with the load-sensing oil passage; the third control cavity $P_G$ of the electro-hydraulic pressure compensation valve is communicated with the working oil port of the first pilot-operated pressure reducing valve; and the oil inlet and the oil outlet of the first pilot-operated pressure reducing valve are respectively communicated with the pilot-operated oil-feed passage and the pilot-operated oil-return passage.

The electro-hydraulic pressure compensation valve is one of a normally opened type and a normally closed type.

In the compensation valve trim, an external diameter $d_1$ of the first spool land and an external diameter $d_3$ of the third spool land of the compensation valve trim are the same, and are both less than an external diameter $d_2$ of the second spool land.

The reversing valve is one of an electro-proportional reversing valve, a hydraulic control reversing valve, and an electro-hydraulic proportional reversing valve.

When the reversing valve is an electro-hydraulic proportional reversing valve, the load-sensing multi-way valve with a variable differential pressure further includes a second pilot-operated pressure reducing valve (20), and a third pilot-operated pressure reducing valve (21), where an oil inlet and an oil outlet of the second pilot-operated pressure reducing valve and an oil inlet and an oil outlet of the third pilot-operated pressure reducing valve are respectively communicated with the pilot-operated oil-feed passage and the pilot-operated oil-return passage; and working oil ports of the second pilot-operated pressure reducing valve and the third pilot-operated pressure reducing valve are respectively communicated with two ends of the reversing valve, and the second pilot-operated pressure reducing valve (20) and the third pilot-operated pressure reducing valve (21) output different pressure according to different control signals to control directions and displacements of the reversing valve.

The multi-way valve in the present invention may be a single valve or multiple valves; and when the multi-way valve is multiple valves, the multiple valves are communicated with multiple actuators, and the multiple valves share the same oil-feed passage, pilot-operated oil-feed passage, pilot-operated oil-return passage, load-sensing oil passage, and oil-return passage, and have same elements and a same structure connection relationship.

An operating principle and process of changing compensated differential pressure in the system are as follows:

A force balance equation of the compensation valve trim can be obtained according to the external diameters of the foregoing compensation valve trim:

$$F_s + p_1 \Box \frac{\pi d_1^2}{4} = p_2 \Box \frac{\pi d_3^2}{4} + p_3 \Box \frac{\pi (d_2^2 - d_3^2)}{4}$$

It can be learned from the foregoing formula that, stress of the compensation valve trim mainly includes four parts: spring force $F_s$, pressure $p_2$ before the reversing valve, pressure $p_1$ after the reversing valve, and output pressure $p_3$ of the first pilot-operated pressure reducing valve, and differential pressure before and after the reversing valve is operating differential pressure $\Delta p$ of the compensation valve. Therefore, compensated differential pressure $\Delta p$ of the compensation valve is as follows:

$$\Delta p = F_s - p_3 \Box \frac{(d_2^2 - d_3^2)}{4} = p_2 - p_1$$

Assuming that the spring force $F_s$ is unchanged, it can be learned from the foregoing formula that, the compensated differential pressure $\Delta p$ of the compensation valve is related to the output pressure $p_3$ of the first pilot-operated pressure reducing valve. When a control signal $I_{signal}$ of the first pilot-operated pressure reducing valve is zero, the output pressure $p_3$ of the first pilot-operated pressure reducing valve is zero, and the compensated differential pressure of the compensation valve is the highest; and an operating mode of the pressure compensation valve is the same as that of a conventional pressure compensation valve. When the first pilot-operated pressure reducing valve outputs pressure $p_3$, the compensated differential pressure of the compensation valve begins to decrease, and is in a linear relationship with the control signal $I_{signal}$ of the pressure reducing valve, so as to implement continuous control of a change in the compensated differential pressure of the compensation valve.

Compared with the prior art, the present invention has the following beneficial effects:

In the present invention, a new electro-hydraulic pressure compensation valve is designed, and implements continuous real-time adjustment and control of compensated differential pressure of the compensation valve and real-time position feedback and monitoring of a compensation valve trim, prompting intelligent development of load-sensing multi-way valves, and laying a foundation for further implementation of advanced control technologies.

In the present invention, a new electro-hydraulic pressure compensation valve is designed, which enlarges a control range of compensated differential pressure, and can implement shunting at any proportion and control for resisting flow saturation, thereby overcoming a flow mismatch problem of a conventional LS system in a flow saturation working condition and problems of a fixed shunting proportion of an LUDV system and poor operation coordination of actuators.

The present invention has a wide application range, and can be applicable to different machine types and working conditions and match compensated differential pressure based on a working condition requirement. When a delicate operation is conducted, compensated differential pressure is reduced, a flow gain is reduced at a valve port, and control stability is improved. When a quick motion is conducted, compensated differential pressure of the compensation valve is increased; a flow gain is increased at a valve port, so as to implement a quick response and efficient operation of an actuator.

Figure 1:
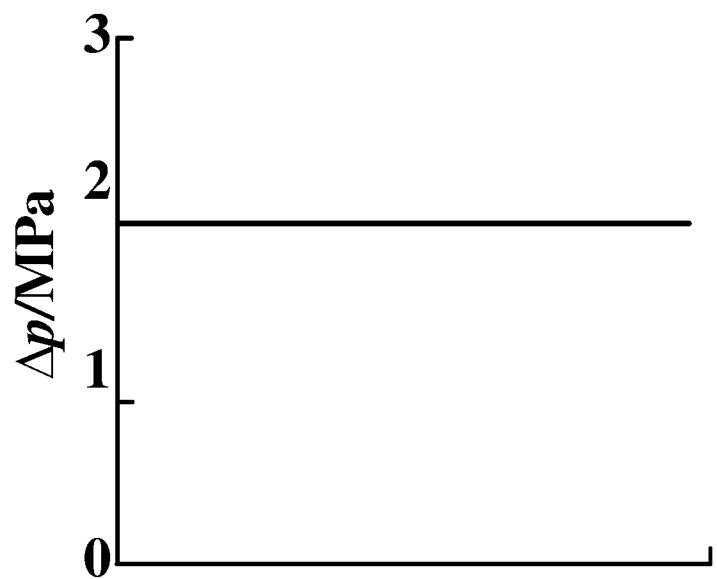
FIG. 1 is a compensated differential pressure control curve of a conventional pressure compensation valve.

In the figures: 1-oil-feed passage; 2-pilot-operated oil-feed passage; 3-pilot-operated oil-return passage; 4-load-sensing oil passage; 5-oil-return passage; 6-reversing valve; 7-check valve; 8-shuttle valve; 9-first one-way overflow valve; 10-second one-way overflow valve; 11-electro-hydraulic pressure compensation valve; 12-first pilot-operated pressure reducing valve; 13-displacement sensor; 14-compensation valve body; 15-compensation valve trim; 16-spring; 17-first spool land; 18-second spool land; 19-third spool land; 20-second pilot-operated pressure reducing valve; 21-third pilot-operated pressure reducing valve; and 22-fourth pilot-operated pressure reducing valve.

DETAILED DESCRIPTION OF EMBODIMENTS

The following further describes in detail the present invention with reference to FIG. 1 to FIG. 6.

Embodiment 1

A load-sensing multi-way valve with a variable differential pressure is provided, and includes at least one valve group, where each valve group includes an oil-feed passage 1, a pilot-operated oil-feed passage 2, a pilot-operated oil-return passage 3, a load-sensing oil passage 4, an oil-return passage 5, a reversing valve 6, a check valve 7, a shuttle valve 8, a first one-way overflow valve 9, and a second one-way overflow valve 10, and the load-sensing multi-way valve with a variable differential pressure further includes an electro-hydraulic pressure compensation valve 11 and a first pilot-operated pressure reducing valve 12.

Figure 2:
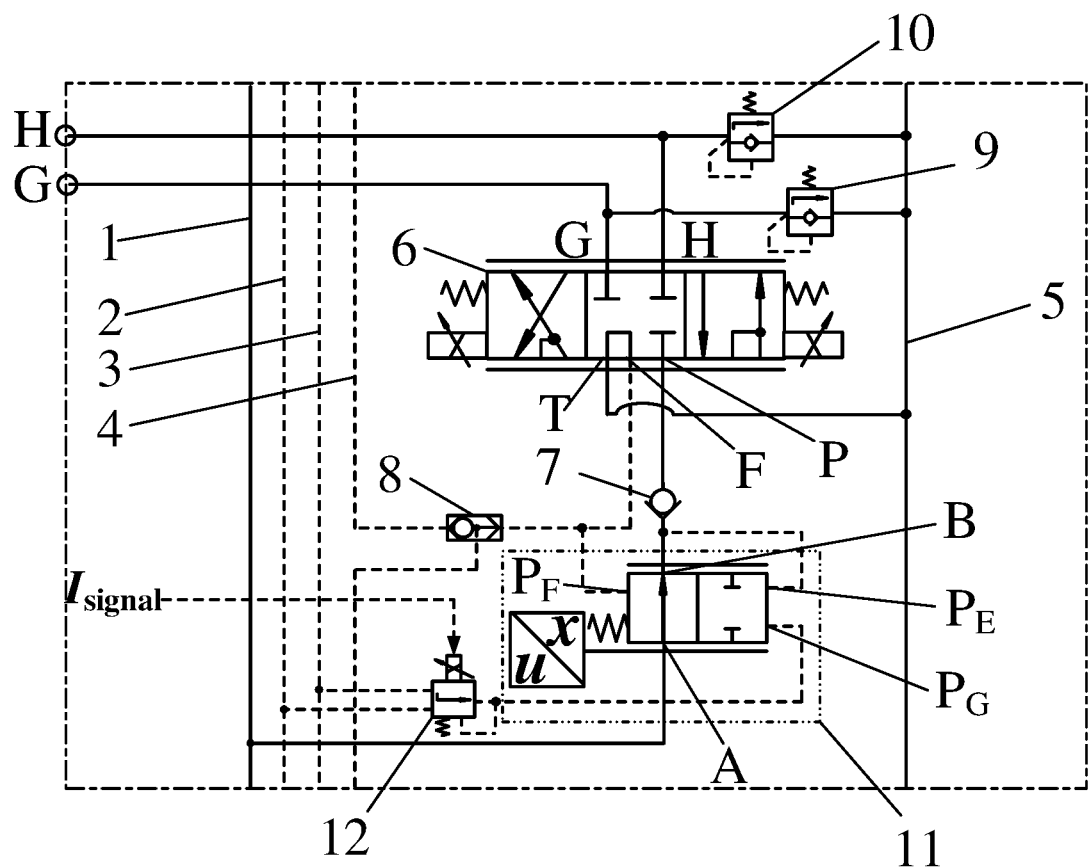
FIG. 2 is a schematic diagram of a system according to Embodiment 1 of the present invention.

As shown in FIG. 2, the electro-hydraulic pressure compensation valve 11 is arranged before the reversing valve 6; an oil inlet A of the electro-hydraulic pressure compensation valve 11 is communicated with the oil-feed passage 1; an oil outlet B of the electro-hydraulic pressure compensation valve 11 is communicated with an oil inlet of the check valve 7 and a second control cavity $P_E$ of the electro-hydraulic pressure compensation valve 11; a third control cavity $P_G$ of the electro-hydraulic pressure compensation valve 11 is communicated with a working oil port of the first pilot-operated pressure reducing valve 12; an oil inlet and an oil outlet of the first pilot-operated pressure reducing valve 12 are respectively communicated with the pilot-operated oil-feed passage 2 and the pilot-operated oil-return passage 3; and the load-sensing oil passage 4 is communicated with an oil detection port F of the reversing valve 6 and a first control cavity $P_E$ of the electro-hydraulic pressure compensation valve through the shuttle valve 8.

Figure 3:
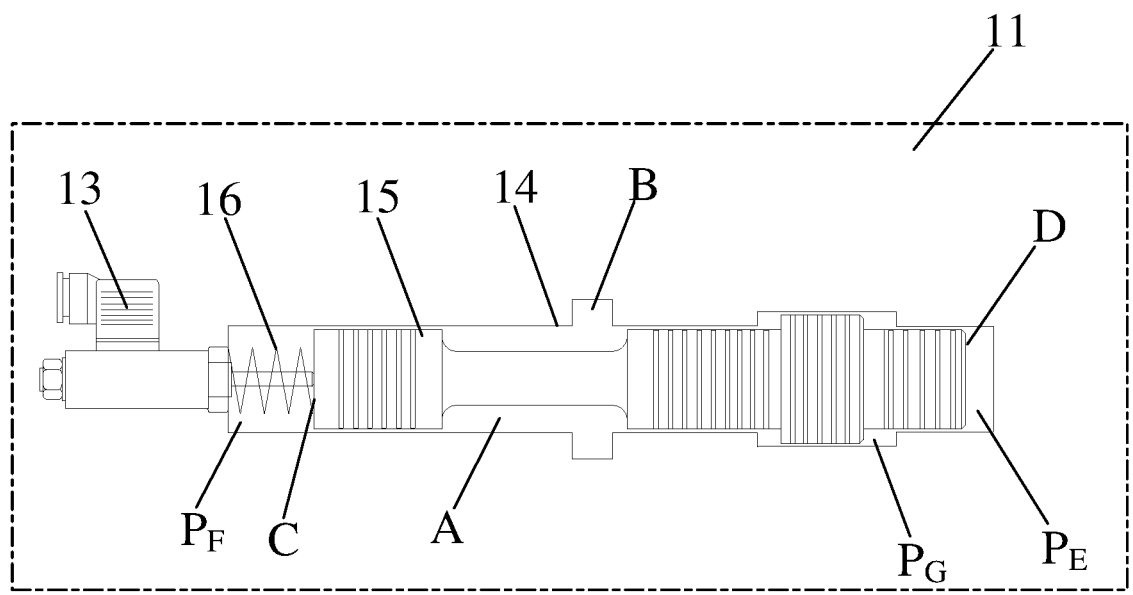
FIG. 3 is a schematic structural diagram of an electro-hydraulic pressure compensation valve according to the present invention.
Figure 4:
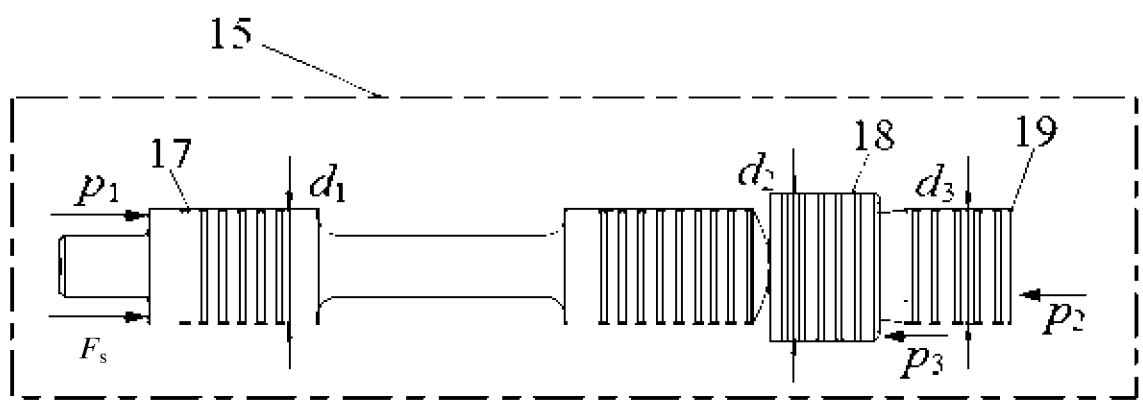
FIG. 4 is a structural diagram of a valve trim of an electro-hydraulic pressure compensation valve according to the present invention.

As shown in FIG. 3 and FIG. 4, the electro-hydraulic pressure compensation valve 11 includes a displacement sensor 13, a compensation valve body 14, a compensation valve trim 15, a spring 16, an oil inlet A, an oil outlet B, a first control cavity $P_F$, a second control cavity $P_E$, and a third control cavity $P_G$, where the compensation valve trim 15 is arranged inside the compensation valve body 14, and includes a first spool land 17, a second spool land 18, and a third spool land 19; one end of the spring 16 acts on a left end surface C of the compensation valve trim 15, and the other end thereof acts on the compensation valve body 14 and forms the first control cavity $P_F$ with the first spool land 17 of the compensation valve trim 15; the displacement sensor 13 is arranged on the compensation valve trim 15 through the compensation valve body 14, and directly detects a position X and a velocity XV of the valve trim; and the second spool land 18 and the third spool land 19 of the compensation valve trim 15 respectively form the third control cavity $P_G$ and the second control cavity $P_E$ with the compensation valve body 14.

The electro-hydraulic pressure compensation valve 11 is one of a normally opened type and a normally closed type.

In the compensation valve trim 15, an external diameter $d_1$ of the first spool land 17 and an external diameter $d_3$ of the third spool land 19 are the same, and are both less than an external diameter $d_2$ of the second spool land 18.

The reversing valve 6 is one of an electro-proportional reversing valve, a hydraulic control reversing valve, and an electro-hydraulic proportional reversing valve.

The multi-way valve in the present invention may be a single valve or multiple valves; and when the multi-way valve is multiple valves, the multiple valves are communicated with multiple actuators, and the multiple valves share the same oil-feed passage 1, pilot-operated oil-feed passage 2, pilot-operated oil-return passage 3, load-sensing oil passage 4, and oil-return passage 5, and have same elements and a same structure connection relationship.

An operating principle and process of changing compensated differential pressure in the system are as follows:

A force balance equation of the compensation valve trim 15 can be obtained according to the external diameters of the foregoing compensation valve trim 15:

$$F_s + p_1 \Box \frac{\pi d_1^2}{4} = p_2 \Box \frac{\pi d_3^2}{4} + p_3 \Box \frac{\pi (d_2^2 - d_3^2)}{4}$$

It can be learned from the foregoing formula, stress of the compensation valve trim 15 mainly includes four parts: spring force $F_s$, pressure $p_2$ before the reversing valve, pressure $p_1$ after the reversing valve, and output pressure $p_3$ of the first pilot-operated pressure reducing valve, and differential pressure before and after the reversing valve is operating differential pressure $\Delta p$ of the compensation valve. Therefore, compensated differential pressure $\Delta p$ of the compensation valve compensation is as follows:

$$\Delta p = F_s - p_3 \Box \frac{(d_2^2 - d_3^2)}{4} = p_2 - p_1$$

Figure 5:
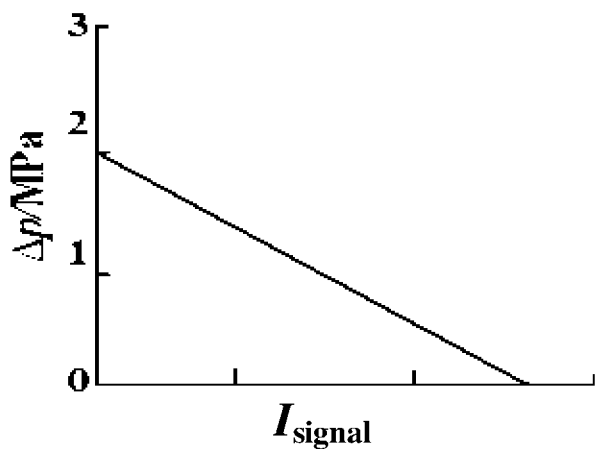
FIG. 5 is a compensated differential pressure control curve of an electro-hydraulic pressure compensation valve according to the present invention.

Assuming that the spring force $F_s$ is unchanged, it can be learned from the foregoing formula that, the compensated differential pressure $\Delta p$ of the compensation valve is related to the output pressure $p_3$ of the first pilot-operated pressure reducing valve. When a control signal $I_{signal}$ of the first pilot-operated pressure reducing valve is zero, the output pressure $p_3$ of the first pilot-operated pressure reducing valve is zero, and the compensated differential pressure of the compensation valve is the highest; and an operating mode of the pressure compensation valve is the same as that of a conventional pressure compensation valve. When the first pilot-operated pressure reducing valve outputs pressure $p_3$, the compensated differential pressure of the compensation valve begins to decrease, and is in a linear relationship with the control signal $I_{signal}$ of the pressure reducing valve, so as to implement continuous control of a change in the compensated differential pressure of the compensation valve. A compensated differential pressure control curve is shown in FIG. 5.

Embodiment 2

Figure 6:
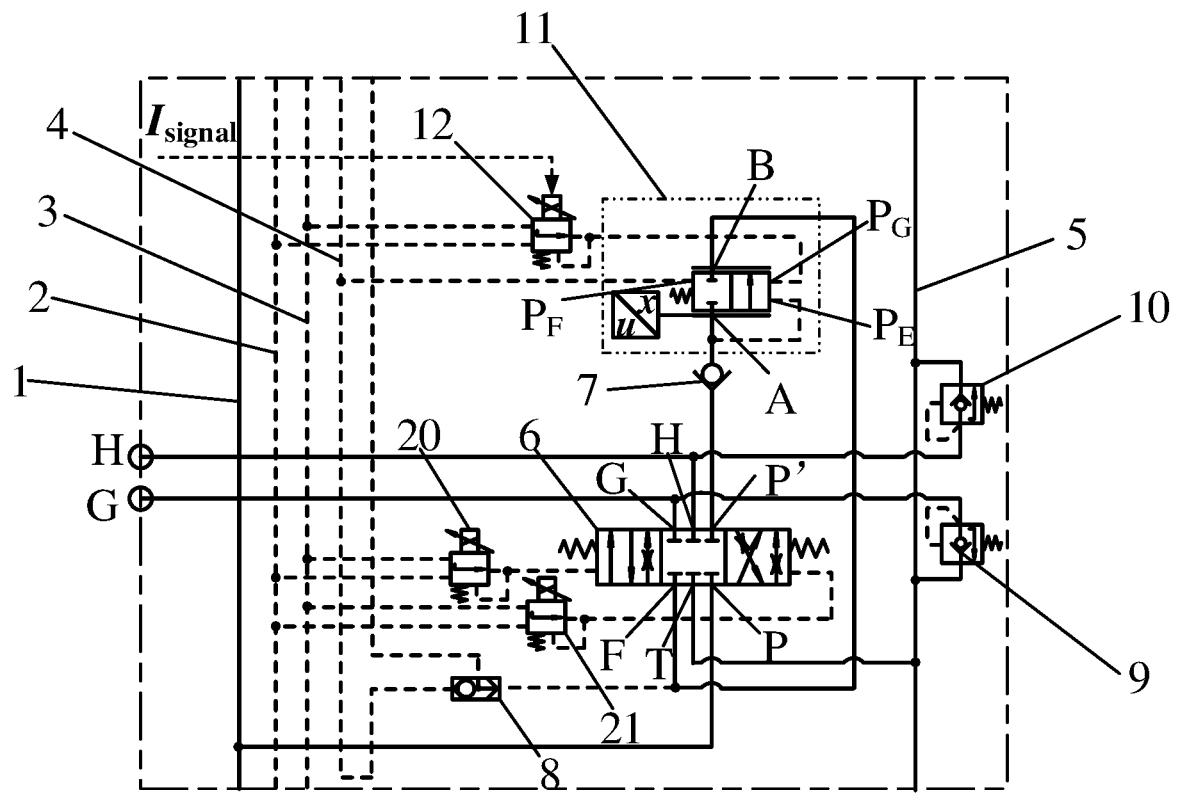
FIG. 6 is a schematic diagram of a system according to Embodiment 2 of the present invention.

As shown in FIG. 6, the present invention provides a second implementation of the load-sensing multi-way valve with a variable differential pressure; a structural composition is the same as that in Embodiment 1; a difference lies in that: A connection manner between the electro-hydraulic pressure compensation valve 11 and the system is changed, and the reversing valve 6 is an electro-hydraulic proportional reversing valve.

The electro-hydraulic pressure compensation valve 11 is arranged after the reversing valve 6; an oil outlet of the check valve 7 is communicated with the oil inlet A of the electro-hydraulic pressure compensation valve 11 and the second control cavity $P_E$ of the electro-hydraulic pressure compensation valve 11; the first control cavity $P_F$ of the electro-hydraulic pressure compensation valve 11 is communicated with the load-sensing oil passage 4; the third control cavity $P_G$ of the electro-hydraulic pressure compensation valve 11 is communicated with the working oil port of the first pilot-operated pressure reducing valve 12; and the oil inlet and the oil outlet of the first pilot-operated pressure reducing valve 12 are respectively communicated with the pilot-operated oil-feed passage 2 and the pilot-operated oil-return passage 3.

When the reversing valve 6 is an electro-hydraulic proportional reversing valve, the system further includes a second pilot-operated pressure reducing valve 20, and a third pilot-operated pressure reducing valve 21, where an oil inlet and an oil outlet of the second pilot-operated pressure reducing valve 20 and the third pilot-operated pressure reducing valve 21 are respectively communicated with the pilot-operated oil-feed passage 2 and the pilot-operated oil-return passage 3; and working oil ports of the second pilot-operated pressure reducing valve 20 and the third pilot-operated pressure reducing valve 21 are respectively communicated with two ends of the reversing valve 6, and the second pilot-operated pressure reducing valve 20 and the third pilot-operated pressure reducing valve 21 output different pressure according to different control signals to control directions and displacements of the reversing valve 6.

Embodiment 3

Figure 7:
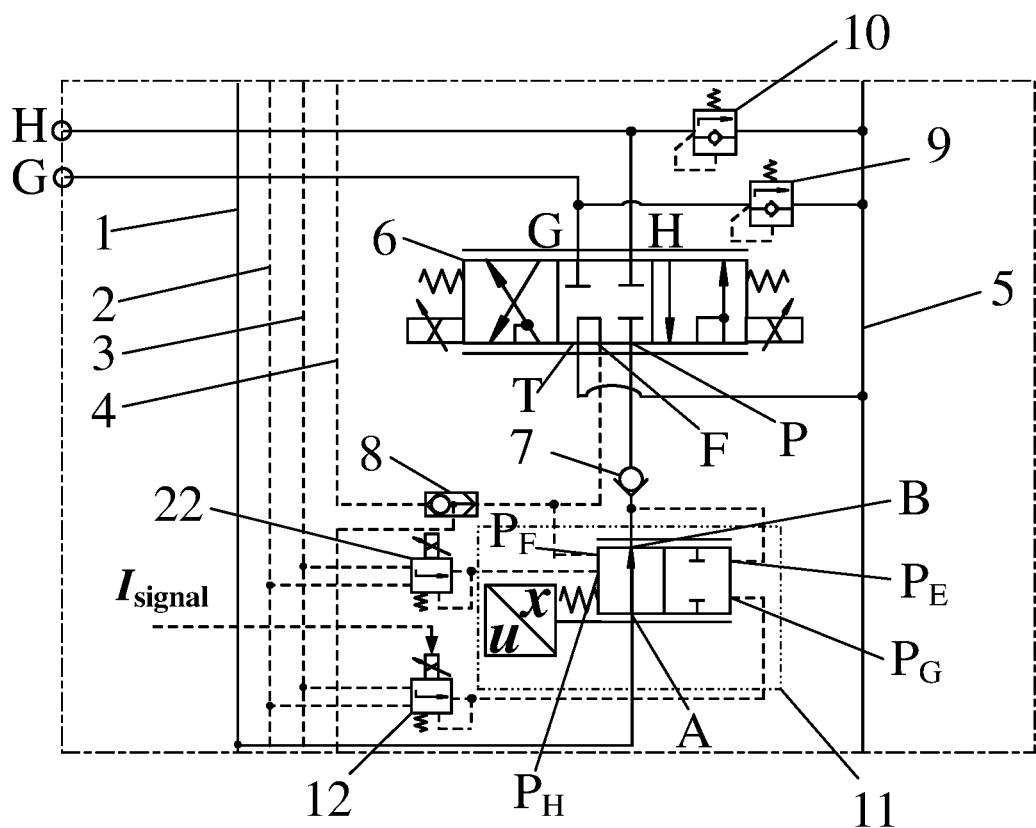
FIG. 7 is a schematic diagram of a system according to Embodiment 3 of the present invention.
Figure 8:
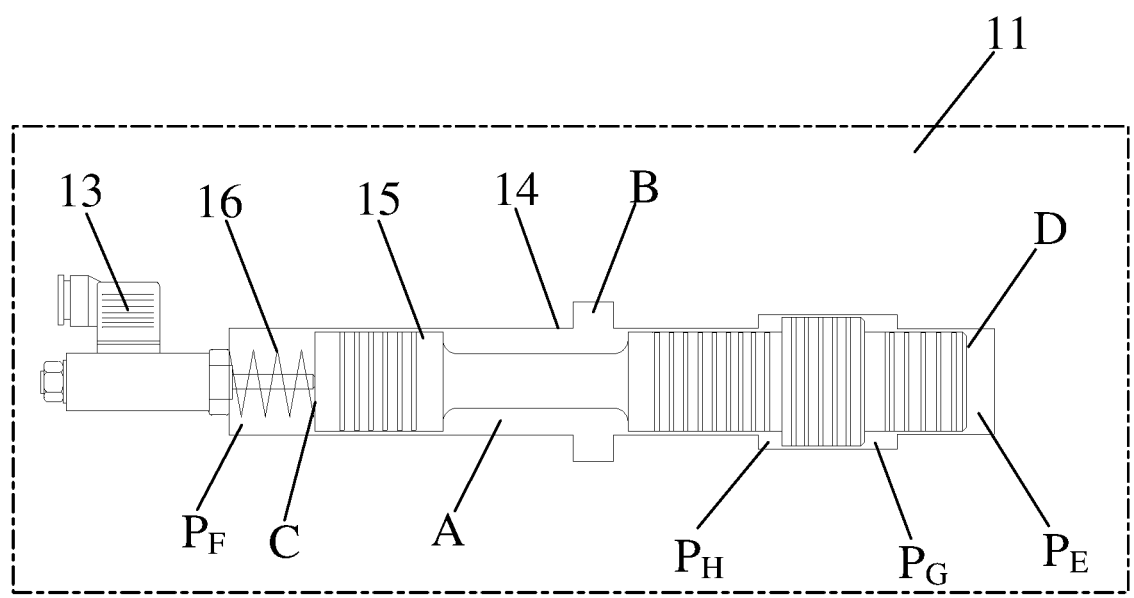
FIG. 8 is another schematic structural diagram of an electro-hydraulic pressure compensation valve according to the present invention.

As shown in FIG. 7 and FIG. 8, the present invention provides a third implementation of the load-sensing multi-way valve with a variable differential pressure. A connection manner of the system is the same as that in Embodiment 1, and a difference lies in that: The load-sensing multi-way valve with a variable differential pressure further includes a fourth pilot-operated pressure reducing valve 22, where the electro-hydraulic pressure compensation valve 11 further includes a fourth control cavity $P_H$. The second spool land of the compensation valve trim forms the fourth control cavity $P_H$ with the compensation valve body; the fourth control cavity $P_H$ of the electro-hydraulic pressure compensation valve is communicated with a working oil port of the fourth pilot-operated pressure reducing valve; and an oil inlet and an oil outlet of the fourth pilot-operated pressure reducing valve are respectively communicated with the pilot-operated oil-feed passage and the pilot-operated oil-return passage.

In a motion process of the valve trim, due to impact of dynamic flow force, its direction makes the valve trim tend to be closed. As shown in FIG. 8, features of this embodiment are provided: the fourth pilot-operated pressure reducing valve 22 and the fourth control cavity $P_H$, and the fourth pilot-operated pressure reducing valve 22 is controlled to output pressure, so as to implement real-time compensation of dynamic flow force exerted on the valve trim in the motion process of the compensation valve trim. In addition, when a single actuator conducts an operation, the fourth pilot-operated pressure reducing valve 22 is controlled to output pressure, which can make the electro-hydraulic pressure compensation valve 11 be in a normally open failure state, to reduce a throttling loss of the system.

What is claimed is:

1. A load-sensing multi-way valve with a variable differential pressure, comprising at least one valve group, wherein each valve group comprises an oil-feed passage (1), a pilot-operated oil-feed passage (2), a pilot-operated oil-return passage (3), a load-sensing oil passage (4), an oil-return passage (5), a reversing valve (6), a check valve (7), a shuttle valve (8), a first one-way overflow valve (9), and a second one-way overflow valve (10); and an electro-hydraulic pressure compensation valve (11) and a first pilot-operated pressure reducing valve (12) are disposed in the load-sensing multi-way valve with a variable differential pressure, wherein the electro-hydraulic pressure compensation valve comprises a displacement sensor (13), a compensation valve body (14), a compensation valve trim (15), a spring (16), an oil inlet (A), an oil outlet (B), a first control cavity ($P_F$), a second control cavity ($P_E$), and a third control cavity ($P_G$), wherein the compensation valve trim is arranged inside the compensation valve body, and comprises three spool lands: a first spool land (17), a second spool land (18), and a third spool land (19); one end of the spring acts on a left end surface (C) of the compensation valve trim, and the other end thereof acts on the compensation valve body and forms the first control cavity ($P_F$) with the first spool land of the compensation valve trim; the displacement sensor is arranged on the compensation valve trim through the compensation valve body, and directly detects a position X and a velocity XV of the valve trim; and the second spool land and the third spool land of the compensation valve trim respectively form the third control cavity ($P_G$) and the second control cavity ($P_E$) with the compensation valve body; and the electro-hydraulic pressure compensation valve is connected to the system in the following two manners:

a connection manner 1: the electro-hydraulic pressure compensation valve is arranged before the reversing valve; the oil inlet (A) of the electro-hydraulic pressure compensation valve is communicated with the oil-feed passage; the oil outlet (B) of the electro-hydraulic pressure compensation valve is communicated with an oil inlet of the check valve and the control cavity ($P_E$) of the electro-hydraulic pressure compensation valve;

the control cavity ($P_G$) of the electro-hydraulic pressure compensation valve is communicated with a working oil port of the first pilot-operated pressure reducing valve; an oil inlet and an oil outlet of the first pilot-operated pressure reducing valve are respectively communicated with the pilot-operated oil-feed passage and the pilot-operated oil-return passage; the load-sensing oil passage is communicated with an oil detection port (F) of the reversing valve and the control cavity ($P_F$) of the electro-hydraulic pressure compensation valve through the shuttle valve; and a connection manner 2: the electro-hydraulic pressure compensation valve is arranged after the reversing valve; an oil outlet of the check valve is communicated with the oil inlet (A) of the electro-hydraulic pressure compensation valve and the control cavity ($P_F$) of the electro-hydraulic pressure compensation valve; the control cavity ($P_E$) of the electro-hydraulic pressure compensation valve is communicated with the load-sensing oil passage; the control cavity ($P_G$) of the electro-hydraulic pressure compensation valve is communicated with the working oil port of the first pilot-operated pressure reducing valve; and the oil inlet and the oil outlet of the first pilot-operated pressure reducing valve are respectively communicated with the pilot-operated oil-feed passage and the pilot-operated oil-return passage.

2. The load-sensing multi-way valve with a variable differential pressure according to claim 1, wherein the electro-hydraulic pressure compensation valve is one of a normally opened type and a normally closed type.

3. The load-sensing multi-way valve with a variable differential pressure according to claim 1, wherein in the compensation valve trim, an external diameter $d_1$ of the first spool land and an external diameter $d_3$ of the third spool land are the same, and are both less than an external diameter $d_2$ of the second spool land.

4. The load-sensing multi-way valve with a variable differential pressure according to claim 1, wherein the reversing valve is one of an electro-proportional reversing valve, a hydraulic control reversing valve, and an electro-hydraulic proportional reversing valve.

5. The load-sensing multi-way valve with a variable differential pressure according to claim 1, wherein when the reversing valve is an electro-hydraulic proportional reversing valve, the load-sensing multi-way valve with a variable differential pressure further comprises a second pilot-operated pressure reducing valve (20) and a third pilot-operated pressure reducing valve (21); an oil inlet and an oil outlet of the second pilot-operated pressure reducing valve and an oil inlet and an oil outlet of the third pilot-operated pressure reducing valve are respectively communicated with the pilot-operated oil-feed passage and the pilot-operated oil-return passage; and working oil ports of the second pilot-operated pressure reducing valve and the third pilot-operated pressure reducing valve are respectively communicated with two ends of the reversing valve, and the second pilot-operated pressure reducing valve (20) and the third pilot-operated pressure reducing valve (21) output different pressure according to different control signals to control directions and displacements of the reversing valve.

6. The load-sensing multi-way valve with a variable differential pressure according to claim 1, wherein the multi-way valve is a single valve or multiple valves; and when the multi-way valve is multiple valves, the multiple valves are communicated with multiple actuators, and the multiple valves share the same oil-feed passage, pilot-operated oil-feed passage, pilot-operated oil-return passage, load-sensing oil passage, and oil-return passage, and have same elements and a same structure connection relationship.

7. The load-sensing multi-way valve with a variable differential pressure according to claim 1, further comprising a fourth pilot-operated pressure reducing valve (22), wherein the electro-hydraulic pressure compensation valve (11) further comprises a fourth control cavity ($P_H$); the second spool land of the compensation valve trim forms the fourth control cavity ($P_H$) with the compensation valve body; the fourth control cavity ($P_H$) of the electro-hydraulic pressure compensation valve is communicated with a working oil port of the fourth pilot-operated pressure reducing valve (22); and an oil inlet and an oil outlet of the fourth pilot-operated pressure reducing valve (22) are respectively communicated with the pilot-operated oil-feed passage and the pilot-operated oil-return passage.

* * * * *